United States Patent [19]

Robers

[11] 4,356,512
[45] Oct. 26, 1982

[54] TELEVISION KEYING CIRCUIT
[75] Inventor: Klaas H. J. Robers, Eindhoven, Netherlands
[73] Assignee: U.S. Philips Corporation, New York, N.Y.
[21] Appl. No.: 137,867
[22] Filed: Apr. 7, 1980
[30] Foreign Application Priority Data
 Apr. 25, 1979 [NL] Netherlands .................. 7903241
[51] Int. Cl.³ .......................................... H04N 5/22
[52] U.S. Cl. ................................. 358/183; 358/22
[58] Field of Search ............................ 358/22, 183
[56] References Cited
 U.S. PATENT DOCUMENTS
 3,986,204 10/1976 Smith ................................. 358/22
 4,122,490 10/1978 Lish ................................... 358/22

Primary Examiner—Richard Murray
Attorney, Agent, or Firm—Thomas A. Briody; William J. Streeter; Edward W. Goodman

[57] ABSTRACT

A keying circuit for television, in the form of a special effect generator or a chroma-keying circuit. In order to generate a keying signal which does not cause flicker phenomena in an interlaced television picture when there is a great contrast in the region of a signal switchover between two video signals in response to the keying signal, the circuit comprises a signal delay circuit and a signal combining circuit for the binary keying signal which occurs undelayed and delayed. The signal delay device has delay times of a field period minus and plus one line period or of one and two line periods, respectively. This results in a gradually changing keying signal there, where the flicker phenomenon in the interlaced television picture might occur.

9 Claims, 12 Drawing Figures

TELEVISION KEYING CIRCUIT

BACKGROUND OF THE INVENTION

The invention relates to a television keying circuit comprising a keying generator and a video signal switching device having a first and a second input for receiving a first and a second video signal, respectively, and an output for supplying one of the two video signals and a signal combination, of the first and the second video signal respectively, and a third input for connection to the keying signal output of the keying generator which comprises one or more inputs for receiving the first, the second and a third signal, respectively, for generating the keying signal at the generator output via a signal delay device.

Such a keying circuit is known from the U.S. Pat. No. 3,941,925 which particularly deals with a digitized special effect generator. It is described that by providing the delay device between the analog switching device and a switching device drive circuit in the keying generator, the switching device is supplied with a gradually changing keying signal instead of with a binary, abruptly changing keying signal. The specification mentions the drawback that the signal delay device having a time delay equal to the duration of the gradual signal transition causes an equally large shift in the displayed, composite picture. To avoid this, the above-mentioned patent proposes to replace the signal delay device, by a device comprising a coding circuit, a variable clock pulse source and a digital-to-analog converter.

For the choice to use a binary, abruptly changing keying signal or a keying signal which gradually changes between two values it holds that the binary keying signal may cause, in an interlaced television picture, a flicker phenomenon in the region of the signal transition. Particularly when there is a great contrast between the first and the second video signal in the region of the video signal switch-over in the picture, the flicker phenomenon may be annoying to the viewer. The use of the keying signal having the gradual signal transition reduces the flicker phenomenon somewhat as edges in the picture are now less sharp.

The problem as regards the use of a binary, abruptly changing keying signal or the use of a keying signal which gradually changes between two values is not only met in the special effects generator but also in chroma-keying circuits for color television. Herein the first video signal represents, for example, a fore-ground against a background of, for example, a blue color. The second video signal represents a background which must be introduced in a picture to be composed in the blue background of the first video signal. Also here the use of a binary keying signal, one of the values corresponding with the color blue, results in a flicker phenomenon. It was tried to derive the chroma-keying signal, which is derived from the first video signal by detection of the blue color information in the first video signal, as a gradually changing signal instead of as a binary signal. When this "soft" keying signal is used it is possible that the background, which must be introduced in the regions of the color blue, becomes perceptible through areas of a bluish color in the foreground. To obviate this, bluish colors must be avoided in the foreground which, compared with the generation of an abrupt, binary keying signal imposes a more severe requirement as regards the foreground information.

When the binary chroma-keying signal is first derived from the first video signal and a gradually changing chroma-keying signal is formed therefrom in one of the two manners described above, some reduction of the flicker phenomenon is obtained as the edges in the picture are now unsharp.

SUMMARY OF THE INVENTION

The invention has for its object to provide a television keying circuit which causes no, or a considerably reduced, flicker phenomenon in a composite, interlaced television picture, and for which no more severe requirements, with regard to the foreground information are necessary. A keying circuit according to the invention is characterized in that the keying generator comprises a signal delay circuit having time delays equal to a television field period minus and plus half a line period or one and two television line periods, respectively, the input of the signal delay circuit being connected to the output of a circuit which is connected to the generator input or inputs for generating a keying signal, the input and two outputs of the signal delay device being connected to inputs of a signal combining circuit the output of which constitutes the modified keying signal output of the keying generator.

The underlying notion of the invention is that the flicker phenomenon gets its major contribution at edges in the picture located in the direction of line scan, in other words the horizontal direction, and that it can be compensated by obtaining the keying signal deriving information from immediately preceding and following television lines. The signal averaging action which is then effected over two interlaced television fields by the use of the delay device having time delays equal to the field period minus and plus one line period has for its result that the flicker phenomenon is fully suppressed. The signal averaging which is effected in one television field only by the use of the time delays of one and two line periods causes a considerable reduction of the flicker phenomenon in the interlaced picture.

A simple embodiment of a signal delay circuit in the keying generator is characterized in that the said signal delay circuit comprises a series arrangement of a first and a second delay device, the first delay device having a time delay equal to a television field period minus half a television line period or equal to a television line period, respectively, and the second delay device having a time delay equal to one television line period, the outputs of the first and the second delay devices being connected to inputs of the signal combining circuit.

To derive a modified keying signal having a gradual signal transition of a desired extent, a keying circuit is characterized in that the signal combining circuit comprises a superposition stage, the output of which constitutes the keying generator output and the inputs of which are connected via signal amplifiers to the input of the signal delay circuit and to the outputs of the first and the second delay devices which have a time delay equal to a field period minus half a line period and equal to a line period, respectively, the gain factors of the signal amplifiers connected to the outputs of the first and of the second delay devices being smaller than the gain factor of the signal amplifier which is connected to the input of the signal delay circuit.

A practically advantageous construction of a keying circuit is further characterized in that the gain factor of the signal amplifiers which are connected to the outputs of the first and the second delay devices have a value which is half the value of the gain factor of the signal amplifier which is connected to the input of the signal delay circuit.

In order to avoid the use of a relatively expensive delay device having a time delay equal to, more or less, one television field period, a keying circuit according to the invention is characterized in that the signal combining circuit comprises a superposition stage the output of which constitutes the keying generator output and the inputs of which are connected via signal amplifiers to the input of the signal delay circuit and to the outputs of the first and the second delay devices, both having a time delay equal to one line period, the gain factors of the signal amplifiers connected to the input of the signal delay circuit and to the output of the second delay device, respectively, being smaller than the gain factor of the signal amplifier which is connected to the output of the first delay device.

A practically advantageous construction of a keying circuit is further characterized in that the gain factors of the signal amplifiers which are connected to the input of the signal delay circuit and to the output of the second delay device, respectively, each have a value which is half the value of the gain factor of the signal amplifier which is connected to the output of the first delay device.

In order to compensate for a time delay produced in the keying generator via the signal delay device, a keying circuit is further characterized in that the first and the second inputs, respectively, of the signal switching device are connected to the outputs of respective additional signal delay devices each having a delay time equal to one line period.

DESCRIPTION OF THE DRAWINGS

The invention will now be further explained by way of non-limitative example with reference to the following Figures wherein.

DESCRIPTION OF THE PREFERRED EMBODIMENT

Figure 1:
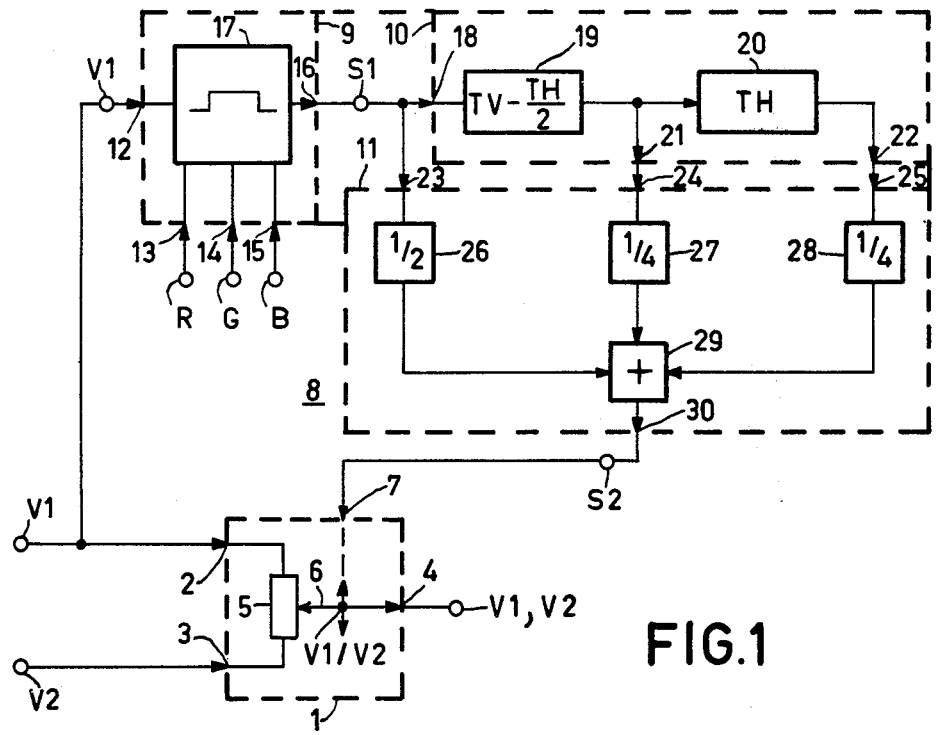
FIG. 1 shows a first embodiment of a television keying circuit according to the invention.

FIG. 1 shows a keying circuit having input terminals for receiving a first and a second video signal V1 and V2, respectively, these terminals being marked accordingly, and having an output terminal for supplying a signal V1, V2, this output terminal being marked accordingly and corresponding to one of the two video signals V1 or V2 and to a signal combination of the video signals V1 and V2, respectively. To that end the circuit shown in FIG. 1 comprises a video signal switching device 1 having a first and a second input, 2 and 3, respectively, to which the respective video signals V1 and V2 are applied, and an output 4 at which the signal V1, V2 become available. For simplicity, the switching device 1 is shown schematically only and is assumed to include a potentiometer 5, the ends of which are connected to the inputs 2 and 3, and a tap 6, connected to the output 4. The tap 6 of the potentiometer 5 is controlled via a third input 7, that is to say the tap 6 is positioned at one of the ends or between the ends of the potentiometer 5, depending on the value of a signal to be applied to the input 7. In the switching device 1 such an operating mode is indicated by V1/V2, V1/V2 in FIG. 2d being shown as signal transition characteristics in a number of cases still to be described hereinafter. For electronic implementations of the schematically shown signal switching device 1 reference is made to the U.S. Pat. No. 3,941,925 and to the German Offenlegungsschrift No. 2,822,720.

The keying circuit shown in FIG. 1 comprises a keying generator 8, which includes a circuit 9 for generating a video keying signal from a signal applied thereto, a signal delay circuit 10 and a signal combining circuit 11. The circuit 9 is optionally provided with one sole input 12 or with several, for example three, inputs 13, 14 and 15, one sole output 16 also being provided. The input 12 is, for example, connected to a terminal at which the video signal V1, shown next to it, occurs. The inputs 13, 14 and 15 may, for example, be connected to associated terminals, in which three color video signals R, G and B, respectively, are applied. Apart from the optional signal supply to the input 12 or to the inputs 13, 14 and 15, it holds that, when the keying circuit shown in FIG. 1 is used in a color television system it may be a so-called chroma-keying circuit. When the sole signal V1 is applied to the input 12 of the circuit 9, this signal may be an encoded color video signal and reference is made to the U.S. Pat. No. 4,040,086 for a possible construction of a signal generator 17 comprised in the circuit 9.

When color video signals R, G and B which represent the red, green and blue color components, respectively, of light coming from a televized scene, this color video signal being either non-coded or having been obtained after previous decoding, the circuit 9 may comprise a signal generator 17; for a possible construction of this generator reference is made to the U.S. Pat. No. 4,051,520.

When the keying circuit shown in FIG. 1 is used as a special effect generator, an arbitrary third signal can be applied to the input 12 instead of the first or the second video signal V1 or V2, for deriving a binary, abruptly changing signal S1.

Independent of the construction of the signal generator 17 in the circuit 9 there occurs at a terminal connected to the output 16 the signal S1 which is shown in FIG. 2b for a number of cases to be described hereinafter.

In the keying generator 8, the output 16 of the circuit 9 is connected to an input 18 of the signal delay circuit 10. In the signal delay circuit 10 the input 18 is connected to a series arrangement of two delay devices 19 and 20 having a time delay equal to one field period TV minus half a line period TH, and a line period TH, respectively. The field period TV may have a duration of, for example, 20 or 16.6 ms and the line period TH a duration of, for example, 64 or 63.5 μs, respectively, depending on the television standard (e.g., PAL or NTSC). The signal delay circuit 10 comprises two outputs 21 and 22, which are connected to the outputs of the devices 19 and 20, the circuit 10 supplying two delayed signals, namely delayed for a television field period TV minus and plus half a line period TH, at these outputs.

The input 18 of the signal delay circuit 10, which input is connected to the output 16 of the circuit 9, is further connected to an input 23 of the signal combining circuit 11, two further inputs 24 and 25 of which being connected to the outputs 21 and 22, respectively, of the signal delay circuit 10. In the signal combining circuit 11, the inputs 23, 24 and 25 are connected to inputs of a superposition stage 29 via signal amplifiers 26, 27 and 28, respectively. The output of the superposition stage 29, which consequently constitutes the output of the signal combining circuit 11 and of the keying generator 8, is denoted by reference numeral 30. The output 30 applies a modified keying signal S2 to a terminal which is connected to the third input 7 of the signal switching device 1. FIG. 2c shows the signal S2 for a number of cases, still to be described hereinafter, in the form in which this signal S2 is derived from the non-delayed and the delayed signal S1 via the signal amplifiers 26, 27 and 28 having gain factors $\frac{1}{2}$, $\frac{1}{4}$ and $\frac{1}{4}$ respectively.

The operation of the keying circuit shown in FIG. 1 will be explained with reference to FIG. 2. Let it be assumed that the video signals V1 and V2 are two encoded video signals, the circuit shown in FIG. 1 operating as chroma-keying circuit. The video signal V1 represents herein a foreground information against, for example, a background of a blue color. In FIG. 2a, V1 represents an area which represents the foreground information in an otherwise blue picture. V2 represents, in FIG. 2a, the background information to be introduced in a composite picture in the region of the blue picture portions associated with the video signal V1. In FIG. 2a, n−3, n−2, n−1, n, n+1, n+2, n+3 indicate lines which represent the scanning lines which are customary in television. The solid lines n−2, n and n+2 are, for example, associated with a first television field and the broken lines n−3, n−1, n+1 and n+3 are, for example, associated with a second television field, these fields forming together an interlaced television picture on display. The area V1 in FIG. 2a shows five edges, one edge being transverse to the direction of the line scan, a long and a short edge being in the direction of line scan and two edges being more or less oblique with respect to the direction of line scan.

When scanning the line n−2 in FIG. 2a, the foreground information occurs at an instant t1 in the video signal V1, whereafter the foreground information passes again into the blue background at an instant t2. The circuit 9 of FIG. 1 then supplies a signal S1, which is shown in FIG. 2b for the line n−2. Thereafter, the line n of FIG. 2a is scanned, t3 and t4 being the starting and the final instants for the foreground information, which results in the signal S1 for the line n in FIG. 2b. Scanning thereafter the line n+2 of FIG. 2a results in the signal S1 of FIG. 2b for the line n+2, with starting and final instants t5 and t6. After approximately a television field period TV the lines n−3, n−1, n+1 and n+3 are sequentially scanned, the starting and final instants t10 and t11, and t12 and t13, respectively, in FIG. 2b, for the foreground information occurring at lines n−1 and n+1, respectively.

The binary signal S1 derived by the circuit 9, is normally utilized for application to the input 7 of the switching device 1. A flicker phenomenon then occurs in the composite, interlaced picture in the manner already described.

In accordance with the present application the flicker phenomenon is prevented from occurring without more severe requirements for the keying signal generation, by means of the provision of the signal delay circuit 10 and the signal combining circuit 11, in response whereto the signal S1, shown in FIG. 2b is converted into the signal S2, shown in FIG. 2c. From the construction of the circuits, shown in FIG. 1 it can be derived for the line n that:

$$S2_n = \tfrac{1}{4} S1_{n-1} + \tfrac{1}{2} S1_n + \tfrac{1}{4} S1_{n+1} \tag{1}$$

as the signals $S1_{n-1}$, $S1_n$ and $S1_{n+1}$ occur at the same instant at the inputs 24, 23 and 25 respectively, resulting in the signal $S2_n$ at the output 30. FIG. 2c shows, at the signal S2 for the line n, that at the instant t3 the signal S1 for the line n produces half an amplitude step, shortly thereafter a quarter amplitude step produced by the signal S1, whioch was delayed for a period TV+$\frac{1}{2}$ TH, for the line n−1, whereafter a further quarter amplitude step follows, produced by the signal S1, which was delayed for a period TV−$\frac{1}{2}$ TH for the line n+1. The signals S2 of FIG. 2c for the various lines n−3 to n+3 inclusive, are computed from the signals S1 of FIG. 2b in a similar manner. It should be noted that for the computation of the signal S2 of the lines n−3 and n+3 it was assumed that the signal S1 of the lines n−4 and n+4 does not show a pulse, so that only the signal S1 of the line n−2 and n+2, respectively, produces the quarter amplitude step in the signal S2 of the line n−3 and n+3, respectively.

FIG. 2d shows the signal transition characteristics V1/V2 for the lines n−2, n−1, n, n+1, n+2. Starting from the modified keying signal S2 in FIG. 2c for the line n, it follows for the characteristic V1/V2 that before the instant t3 the background information V2 (FIG. 2a) originating from the video signal V2, occurs for 100% in the signal at the output 4 of the signal switching device 1. The potentiometer tap 6 is then in the bottom position. At the instant t3 the position of the potentiometer 5 changes and the tap 6 is moved to the center, so that the signals V1 and V2 are both passed on for 50% to the output 4. Shortly after the instant t3 the proportion of the signals V1 and V2, respectively, is increased and decreased, respectively, to 75% and 25%, respectively, of the output signals V1, V2. Thereafter the passed-on signal V1 is further increased to 100%, so that the signal V2 no longer makes a contribution. The potentiometer tap 6 is then in the upper position. At the instant t4 a switch-over takes place between 0 and 100% for the signals V2 and V1.

In a similar manner, the signal transition characteristics V1/V2 for the lines n−2, n−1, n+1 and n+2 are shown, starting from the modified keying signals S2 of FIG. 2c for these lines. FIG. 2d does not show a signal transition characteristics V2/V1 for the lines n−3 and n+3, but it is easy to deduce from the preceding description that the signal S2 for the lines n−3 and n+3 produces a combination signal at the output 4 with a value of 25% and 75%, respectively, of the signal V1 and V2, respectively.

When the signal S1 of FIG. 2b is directly used as a binary keying signal it appears that there is a signal transition characteristic between 0 and 100% and vice versa. A closer study of the signals S1 of FIG. 2b for the interlaced lines n−3, n−2, and n−1 shows that, considered transverse to the line direction, a switch-over from 0 to 100% occurs in one field between the lines n−3 and n−1 and in the other field between the lines n−4 (not shown) and n−2. A closer view of the television picture shows that in one field the transition appears to be on the line n−2 and in the other field on the line n−3. In case of an in situ presence of a great contrast between the signals V1 and V2 to be switched, the shifted switch-over produces a flicker phenomenon of half the field frequency. The shifted switch-over at the instants t1, t3, t10 and t3, t5, t12 in the signals S1 of FIG. 2b also causes a shift transition transverse to the line direction, which results in a flicker phenomenon which, however, is less distinctly perceptible.

This use of the signal S2 of FIG. 2c as a gradually changing keying signal produces a signal transition characteristic V1/V2, which may change step-wise between 0, 25, 50, 75 and 100%. For the described transition transverse to the line direction, there follows a gradual switch-over in one field between 0% for the line n−5, not shown, 25% for the line n−3 and 100% for the line n−1, whereas in the other field the gradual switch-over takes place between 0% for the line n−4, not shown, 75% for the line n−2 and 100% for the line n. The flicker phenomenon inducing, abrupt transition appears to be absent. The same applies to the transition transverse to the line direction at the instants t1, t3, t10 and t3, t5, t12.

FIG. 1 shows a simple embodiment of the signal delay circuit 10 comprising the series arrangement of the devices 19 and 20. The device 20 having a time delay equal to a line period TH may be in the form of a glass delay line or a solid state store. The device 19 which has a delay time equal to a field period TV minus half a line period TH may, for example, be in the form of a solid state store or a disc storage device. The specific construction of the delay devices 19 and 20 is irrelevant; due to the fact that the signal S1 is a binary signal, any digital store having sufficient capacity can be used.

FIG. 1 shows the values $\frac{1}{2}$, $\frac{1}{4}$ and $\frac{1}{4}$, respectively, as the gain factor of the signal amplifiers 26, 27 and 28 in the signal combining circuit 11. Advantageously, the proportion of the undelayed signal S1 in the modified keying signal S2 is in all cases greater than the proportion of the delayed signals at the inputs 24 and 25. In practice, the above-mentioned factors $\frac{1}{2}$, $\frac{1}{4}$ and $\frac{1}{4}$, by means of which a weighted signal averaging is achieved, appear to be a very good choice.

FIG. 1 shows a single signal switching device 1 to which the two video signals V1 and V2 are applied. When instead of two encoded color video signals V1 and V2, the color signals R1, G1, B1 and R2, G2, B2, of which these encoded color video signals V1, V2 are composed and which are not shown, must be switched-over, a set of three devices 1 must be used, one for each color signal.

Figure 3:
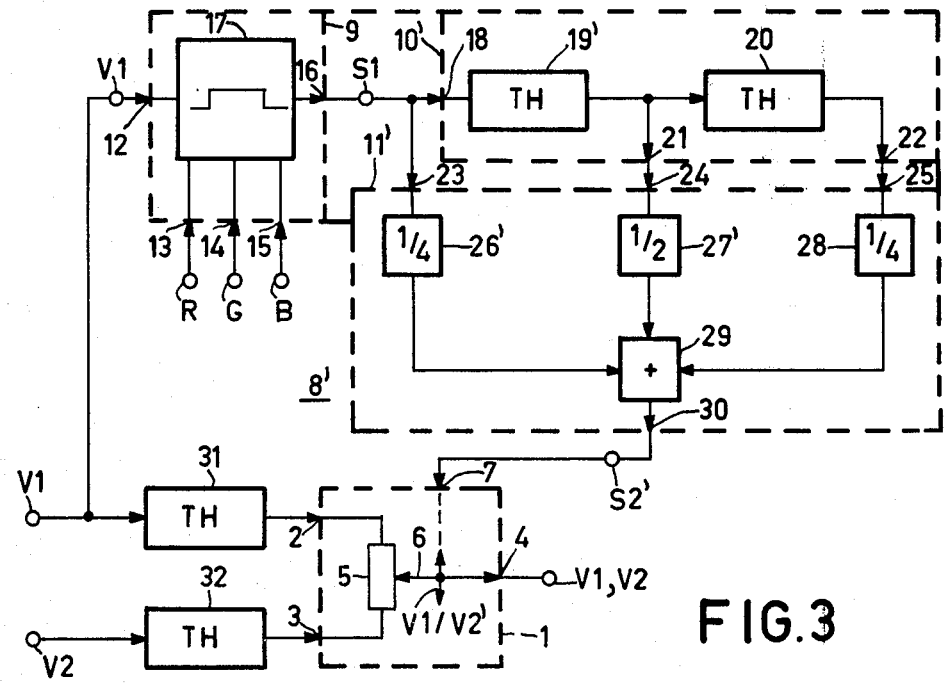
FIG. 3 shows a second embodiment of the invention.

FIG. 3 shows a second embodiment of a keying circuit. Identical components are given the same reference numerals, modified components having been marked with an accent. The signal switching device 1 and the circuit 9 are, for example, identical. The signal delay circuit 10′ comprises a first delay device 19′, having a time delay equal to one line period TH. The signal combining circuit 11′ comprises the signal amplifiers 26′ and 27′, having a gain factor equal to $\frac{1}{4}$ and $\frac{1}{2}$, respectively. This results in that the output 30 carries a modified keying signal S2′, which is plotted in FIG. 4c for the lines n−3 to n+3, inclusive, starting from FIGS. 4a and 4b which are identical to the FIGS. 2a and 2b.

The keying generator 8′ of FIG. 3 comprises two delay devices 19′ and 20, each having a time delay equal to a line period TH. As it is advantageous to choose in the modified keying signal S2′ the contribution of signal S1 for a given line to be greater ($\frac{1}{2}$) than the contribution ($\frac{1}{4}$) of an immediately preceding and following line in the field, the signal S2′ for the line n is formed in accordance with the formula:

$$S2'_n = \tfrac{1}{4} S1_{n-2} + \tfrac{1}{2} S1_n + \tfrac{1}{4} S1_{n+2} \tag{2}$$

the signals $S1_{n+2}$, $S1_n$ and $S1_{n-2}$ being simultaneously present at the inputs 23, 24 and 25, respectively. It appears that the undelayed signals $S1_{n-2}$ occurs simultaneously with the signal $S2'_n$, which means a delay of one line period for the modified keying signal $S2'_n$ so that, to enable a correct switching at the video signals V1 and V2, they must have been subjected to the same delay. To that end the terminals and the video signals V1 and V2 indicated next to them are connected to the inputs 2 and 3, respectively, of the signal switching device 1 via delay devices 31 and 32, respectively, each having a time delay equal to a line period TH.

Figure 4:
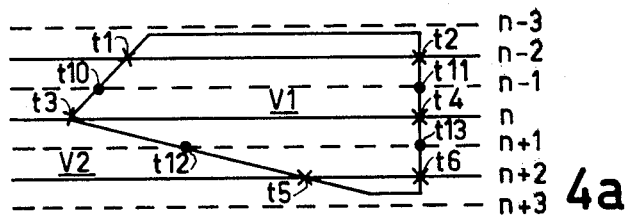
FIG. 4 shows in FIGS. 4a, 4b, 4c and 4d a scene portion, some signals and signal transition characteristics associated with the circuit shown in FIG. 3, respectively.
Figure 4:
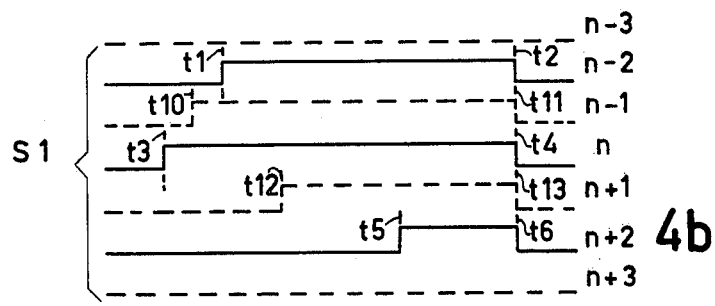
Figure 4:
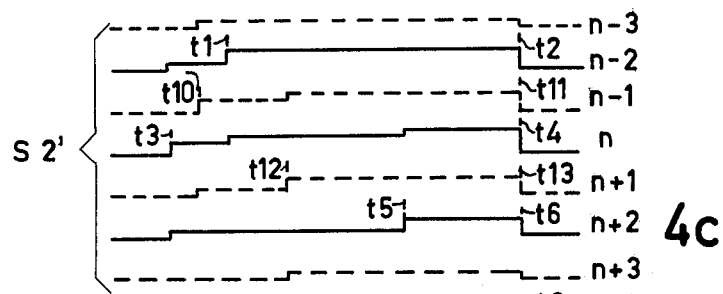
Figure 4:
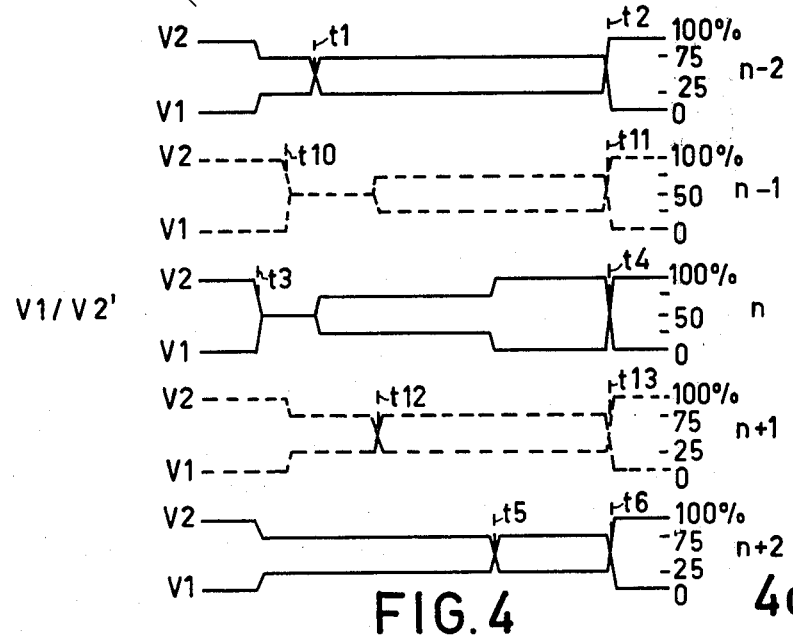

The modified keying signals S2′ of FIG. 4c for the lines n−2 to n+2 inclusive, result in the manner described for FIG. 2c and FIG. 2d, in the signal transition characteristic V1/V2′, shown in FIG. 4d. Comparing the modified keying signal S2 of FIG. 2c with S2′ of FIG. 4c and the signal transition characteristic V1/V2 of FIG. 2d with V1/V2′ of FIG. 4d shows that, for the case of FIG. 4, the gradual signal transition takes place over a larger area, in the line direction as well as transversely thereto. It holds, for example, for the line n−1 that the signal transition characteristic V1/V2 attains 100% for the signal V1, whereas with the characteristic V1/V2′ the signal V1 attains a maximum of 75% and that over a smaller distance into the line direction.

Compared to the circuit of FIG. 3, the circuit shown in FIG. 1 has the advantage that it has a gradual signal transition over a limited area, which requires a relatively expensive digital delay device 19 having a time delay equal to, more or less, a television field period. The circuit shown in FIG. 3 has the advantage that it does not require the digital delay device 19, but it has the drawback that it requires a digital delay device 19′ having a time delay of one line period and two analog delay devices 31 and 32, having a delay time of one line period for the video signals V1 and V2, the gradual signal transition furthermore occurring over a larger area.

To explain the difference in operation of the circuits shown in FIGS. 1 and 3 the following should be noted. When the starting point is a stationary picture, a flicker phenomenon may occur where, as in the two interlaced fields, there is a great contrast in the region of the signal switch-over between the two video signals, and this contrast is shifted over one television lines in the vertical direction by the interlaced scanning. The use of the circuit shown in FIG. 1 has the advantage, when deriving the gradually changing keying signal, that signal averaging is effected over two television fields, so that the flicker phenomenon is fully suppressed. This is not the case when signal averaging is done in only one field as described for FIG. 3, but in practice it appears that the flicker phenomenon is considerably reduced.

Figure 2:
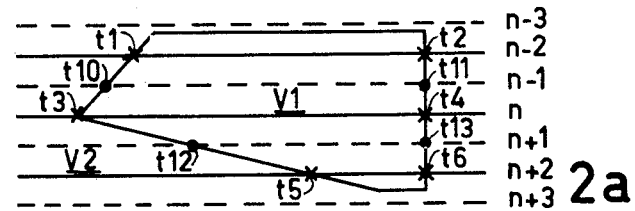
FIG. 2 shows schematically in FIG. 2a a scene portion to be processed by the television keying circuit, in FIGS. 2b and 2c some signals occurring in the circuit shown in FIG. 1 and in FIG. 2d signal transition characteristics occurring in the circuit shown in FIG. 1.
Figure 2:
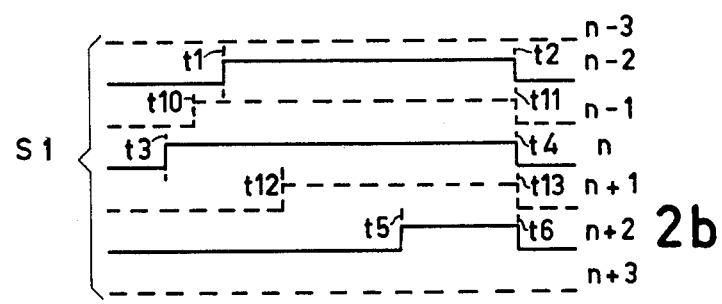
Figure 2:
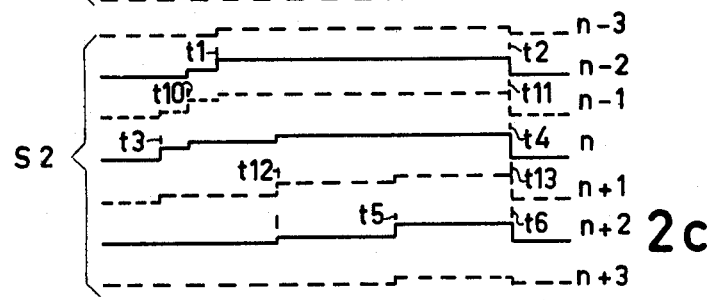
Figure 2:
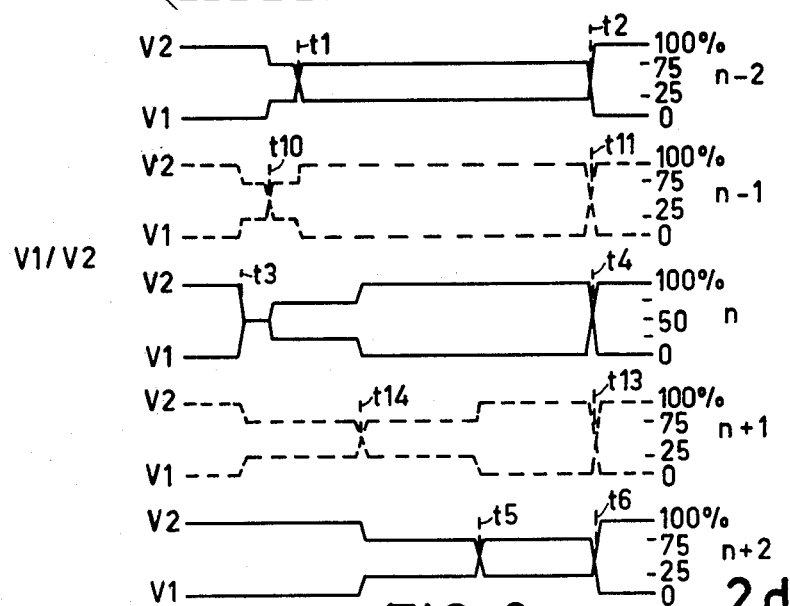

From the FIGS. 2 and 4 it appears that at a vertical edge, as shown in the drawings at the instants t2, t4, t6, t11 and t13 an abrupt signal switch-over from 0 to 100% and vice versa occurs instead of a gradual switch over. In addition, it appears that a gradual signal transition does occur at a somewhat oblique edge, as shown at the instants t1, t3, t10. It can be concluded that an abrupt signal switch-over takes place at a purely vertical edge, which is permissible as no flicker phenomenon will occur there, as would be the case for an edge which is not purely vertical, as described for the instants t1, t3, t10 and t3, t5, t12 at the signal S1 of FIG. 2b. Namely, the flicker phenomenon is caused by the fact that an edge has been shifted into the vertical direction in the interlaced picture, the signal switch-over taking place near that edge.

What is claimed is:

1. A television keying circuit, for switching between two video signals in which a resultant interlaced picture exhibits substantially no flicker, having a keying generator and a video signal switching device, said video signal switching device including a first and a second input for receiving a first and a second video signal, respectively, and an output for supplying one of the two video signals or a signal combination of the first and the second video signal, and a third input for receiving a modified keying signal for the control thereof, and said keying generator including one or more inputs, for receiving the first, the second and a third signal, and an output for supplying the modified keying signal, characterized in that the keying generator comprises a circuit coupled to said keying generator input, or inputs for generating a keying signal, a signal delay circuit having an input and two outputs exhibiting time delays equal to a television field period minus and plus half a line period, respectively, the input of the signal delay circuit being connected to the output of said circuit for generating said keying signal, and a signal combining circuit having inputs to which the input and two outputs of the signal delay circuit are connected and an output which constitutes the modified keying signal output of the keying generator.

2. A television keying circuit as claimed in claim 1, characterized in that said signal delay circuit comprises a series arrangement of a first and a second delay device, the first delay device having a time delay equal to a television field period minus half a television line period, and the second delay device having a time delay equal to one television line period, the outputs of the first and the second delay devices being connected to inputs of the signal combining circuit.

3. A television keying circuit as claimed in claim 2, characterized in that the signal combining circuit comprises a superposition stage the output of which constitutes the keying generator output and inputs of which are connected via signal amplifiers to the input of the signal delay circuit and to the outputs of the first and the second delay devices the gain factors of the signal amplifiers connected to the outputs of the first and of the second delay devices being smaller than the gain factor of the signal amplifier which is connected to the input of the signal delay circuit.

4. A television keying circuit as claimed in claim 3, characterized in that the gain factors of the signal amplifiers which are connected to the outputs of the first and the second delay devices each have a value which is half the value of the gain factor of the signal amplifier which is connected to the input of the signal delay circuit.

5. A television keying circuit, for switching between two video signals in which a resultant interlaced picture exhibits substantially no flicker, having a keying generator and a video signal switching device, said video signal switching device including a first and a second input for receiving a first and a second video signal, respectively, and an output for supplying one of the two video signals or a signal combination of the first and the second video signal, and a third input for receiving a modified keying signal for the control thereof, and said keying generator including one or more inputs, for receiving the first, the second and a third signal, and an output for supplying the modified keying signal, characterized in that the keying generator comprises a circuit coupled to said keying generator input, or inputs for generating a keying signal, a signal delay circuit having an input and two outputs exhibiting time delays equal to one and two television line periods, respectively, the input of the signal delay circuit being connected to the output of said circuit for generating said keying signal, and a signal combining circuit having inputs to which the input and two outputs of the signal delay circuit are connected and an output which constitutes the modified keying signal output of the keying generator.

6. A television keying circuit as claimed in claim 5, characterized in that said signal delay circuit comprises a series arrangement of a first and a second delay device, each of said delay devices having a time delay equal to one television line period, the outputs of the first and the second delay devices being connected to the inputs of said signal combining circuit.

7. A television keying circuit as claimed in claim 5, characterized in that the signal combining circuit comprises a superposition stage the output of which constitutes the keying generator output and inputs of which are connected via signal amplifiers to the input of the signal delay circuit and to the outputs of the first and the second delay devices, the gain factors of the signal amplifiers connected to the input of the signal delay circuit and to the output of the second delay device, respectively, being smaller than the gain factor of the signal amplifier which is connected to the output of the first delay device.

8. A television keying circuit as claimed in claim 7, characterized in that the gain factors of the signal amplifiers which are connected to the input of the signal delay circuit and to the output of the second delay device, respectively, each have a value which is half the value of the gain factor of the signal amplifier which is connected to the output of the first delay device.

9. A television keying circuit as claimed in claim 8, characterized in that the first and the second input, respectively, of the signal switching device is connected to the output of respective additional signal delay devices each having a time delay equal to one line period.

* * * * *